(12) United States Patent
Kolodziej

(10) Patent No.: US 6,868,462 B2
(45) Date of Patent: Mar. 15, 2005

(54) INTERMEDIATE RESOURCE MANAGEMENT DEVICE

(75) Inventor: Ryan Kolodziej, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 09/951,584

(22) Filed: Sep. 12, 2001

(65) Prior Publication Data

US 2003/0051079 A1 Mar. 13, 2003

(51) Int. Cl.$^7$ .......................... G06F 13/12; G06F 13/38
(52) U.S. Cl. ............................. 710/62; 710/65; 710/72
(58) Field of Search ........................ 399/24; 358/296; 709/224; 710/62, 8, 65, 72

(56) References Cited

U.S. PATENT DOCUMENTS

| | | | | |
|---|---|---|---|---|
| 5,021,828 A | * | 6/1991 | Yamaguchi et al. | 399/24 |
| 5,438,528 A | * | 8/1995 | Emerson et al. | 709/224 |
| 5,521,710 A | * | 5/1996 | Strossman et al. | 358/296 |
| 5,812,156 A | | 9/1998 | Bullock et al. | |
| 6,113,208 A | | 9/2000 | Benjamin et al. | |
| 6,126,265 A | | 10/2000 | Childers et al. | |

* cited by examiner

*Primary Examiner*—Jeffrey Gaffin
*Assistant Examiner*—Joshua D Schneider

(57) ABSTRACT

A device for effecting communication between a peripheral and a host computer of the present invention. The invention is particularly well-adapted for use with printers, copies and other devices not equipped with consumable resource sensing technology at the time of manufacture. In general, the inventive device is disposed within a separate housing and includes an interface for effecting signal translation and routing as necessary between the peripheral and a host computer. The device further includes first mechanisms for effecting communication between a sensor operationally coupled to the peripheral and the interface. Further included are second mechanisms for effecting communication between the interface and the host computer. Plural sensors may be operationally coupled to the peripheral. In the best mode, the sensors are E-LABEL$_{tm}$ sensors. The interface may be implemented with a microprocessor, digital logic or simple discrete components depending on the application. In a typical implementation, the first mechanisms will be electrical connectors. However, the present invention is adapted for wireless and optical connection as well. The second connection mechanisms to the host system may be implemented with serial, parallel, universal serial bus (USB), wireless, optical and other connection technologies.

24 Claims, 4 Drawing Sheets

INTERMEDIATE RESOURCE MANAGEMENT DEVICE

BACKGROUND OF THE INVENTION

1. Field of Invention

This invention relates to systems and methods for resource management. Specifically, the present invention relates to systems and methods for managing consumables in printers, copiers, and the like.

2. Description of the Related Art

Consumables management is critical in the operation of printers, copiers and other devices that expend resources such as ink, toner, and/or media. The need for consumables management is being addressed by the present assignee by way of a number of technological innovations of which several issued U.S. patents are representative. See for example U.S. Pat. No. 6,126,265 issued Oct. 3, 2000 to Childers et al. and entitled Ink Jet Printer Service Station Controlled By Data From Consumable Parts With Incorporated Memory Devices; U.S. Pat. No. 6,113,208 issued Sep. 5, 2000 to Benjamin at al. and entitled Replaceable Cartridge For A Printer Including Resident Memory With Stored Mmage Triggering Data; and U.S. Pat. No. 5,812,156 issued Sep. 22, 1998 to Bullock et al. and entitled Apparatus Controlled Dy Data From Consumable Parts With Incorporated Memory Devices, the teachings of all of which are incorporated herein by reference.

These references are representative of the current art inasmuch the references show that consumables management is currently available on newer printers designed to incorporate E-LABEL$_{tm}$ technology. E-LABEL$_{tm}$ technology involves the incorporation of sensors and memory into print engines, print heads and/or print cartridges and readout electronics, as original equipment, into the printer, copier or other host system. E-LABEL$_{tm}$ is a trademark of Hewlett-Packard Company.

While this provides an effective consumables management solution for newer devices originally equipped with the technology, a need remains in the art for a comparably effective solution for installed base of older devices not originally equipped with E-LABEL technology.

SUMMARY OF THE INVENTION

The need in the art is addressed by a device for effecting communication between a peripheral and a host computer implemented in accordance with the teachings of the present invention. The invention is particularly well adapted for use with printers, copiers, and other devices not equipped with consumable resource sensing technology at the time of manufacture. In general, the inventive device is disposed within a separate housing and includes an interface for effecting signal translation and routing as necessary between the peripheral and a host computer. The device further includes first mechanisms for effecting communication between a sensor operationally coupled to the peripheral and the interface. Further included are second mechanisms for effecting communication between the interface and the host computer.

Plural sensors may be operationally coupled to the peripheral. In the best mode, the sensors are E-LABEL$_{tm}$ sensors. The interface may be implemented with a microprocessor, digital logic or simple discrete components depending on the application. In a typical implementation, the first mechanisms will be electrical connectors. However, the present invention is adapted for wireless and optical connection as well.

The second connection mechanisms to the host system may be implemented with serial, parallel, universal serial bus (USB), wireless, optical and other connection technologies.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
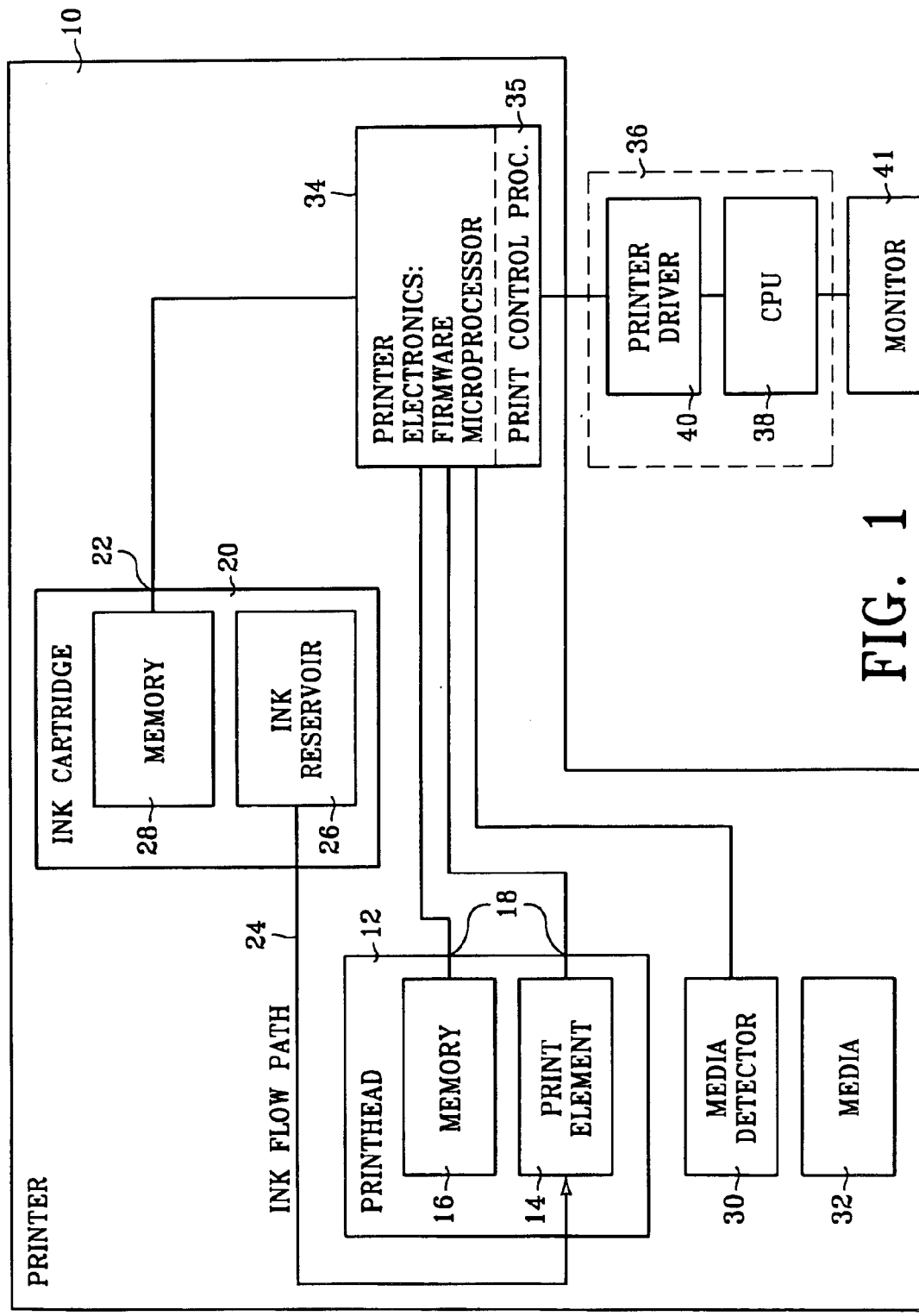
FIG. 1 is a block diagram of an ink jet printer with onboard consumable management functionality implemented in accordance with prior teachings.

FIG. 1 is a block diagram of an ink jet printer with onboard consumable management functionality implemented in accordance with prior teachings. As disclosed more fully in the above-referenced patent issued to Bullock et al., the ink jet printer 10 includes a pluggable printhead 12 which includes a print element 14 and an integrally mounted printhead memory 16. Printhead 12 is pluggably removable from printer 10 via interconnects 18. An ink cartridge 20 is also pluggably removable from printer 10 via electrical interconnect 22 and fluidic interconnect 24. Ink cartridge 20 includes an ink reservoir 26 and an integral cartridge memory 28. The contents of memories 16 and 28 enable real time control of ink jet printer 10 to produce high quality printed media.

A media detector 30 is positioned to scan an incoming media sheet 32 and determine from characteristics thereof, the specific type of media sheet which is being presented to printhead 12 for printing. Media sheet 32 may carry indicia that is only visible to media detector 30 (e.g., via an infra-red scan) or other indicia indicative of the media type.

Ink cartridge 20, printhead 12 and media detector 30 are interconnected to a microprocessor 34 which includes both electronics and firmware for the control of the various printer sub-assemblies. A print control procedure 35, which may be incorporated in the printer driver, causes the reading of data from cartridge memory 28 and printhead memory 16 and adjusts printer control parameters in accordance with parameter re-calculations based upon the data accessed from both memories.

A host processor 36 is connected to microprocessor 34 and includes a central processing unit (CPU) 38 and a software printer driver 40. A monitor 41 is connected to host processor 36 and is used to display various messages that are indicative of the state of ink jet printer 10.

As mentioned above, most printers, copiers, and other devices that use consumable resources, currently in operation are not equipped with an onboard consumables management system such as that illustrated in FIG. 1. The need for an add-on consumables management system for such devices is exacerbated when the devices are installed on a network. That is, in a network implementation, the host computer may be located remotely from the printer making manual monitoring of resources and other device parameters problematic.

The need in the art is addressed by the present invention which provides a device for effecting communication between a peripheral and a host computer. The invention is particularly well-adapted for use with printers, copiers, and other devices not equipped with consumable resource sensing technology at the time of manufacture. An illustrative embodiment of the invention is provided in FIGS. 2–5 below.

Figure 2:
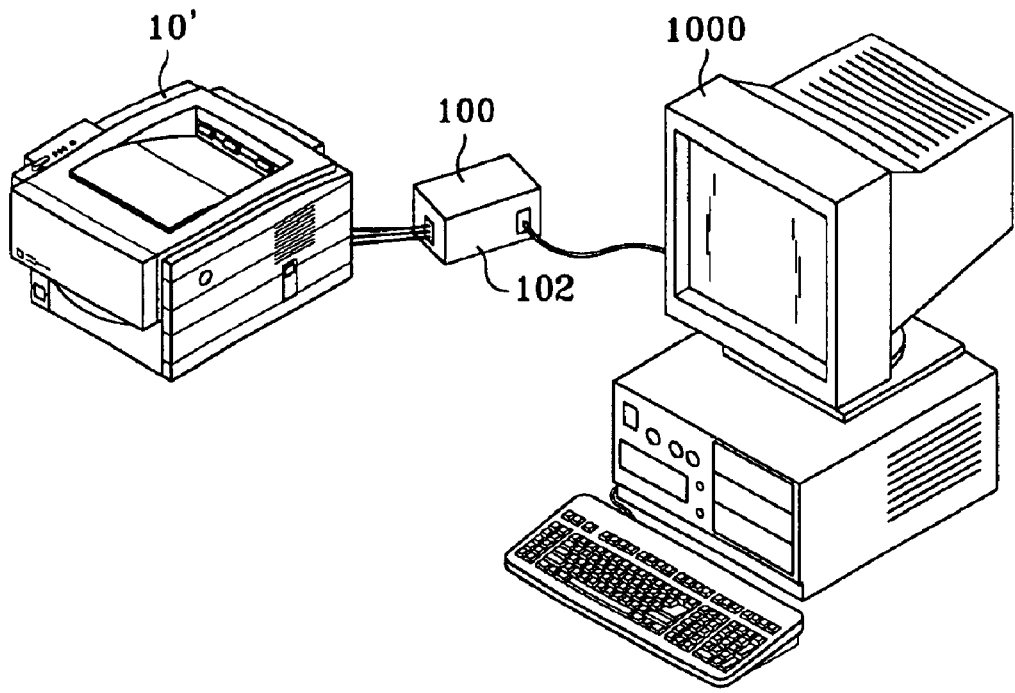
FIG. 2 is a diagram showing an illustrative application of a resource management device disposed between a printer and a personal computer.

FIG. 2 is a diagram showing an illustrative application of a resource management device 100 disposed between a printer 10' and a personal computer 1000. The inventive device 100 is disposed within a separate housing 102 and includes an interface (not shown in FIG. 2) for effecting signal translation and routing as necessary between the peripheral 10' and a host computer 1000.

Figure 3:
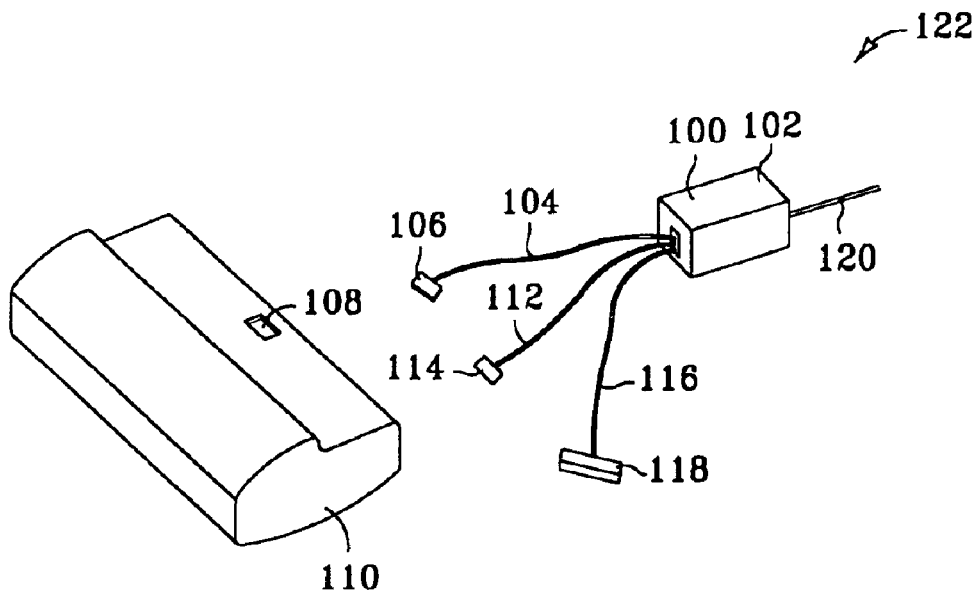
FIG. 3 is diagram showing illustrative wiring connections between the device implemented in accordance with the present teachings and a printer cartridge.

FIG. 3 is diagram showing illustrative wiring connections between the device 100 implemented in accordance with the present teachings and a printer cartridge. Extending from the housing 102 are a number of wire connectors. A first wire 104 is terminated with an E-LABEL connector 106. The connector 106 is adapted to mate with a matching connector 108 disposed on a cartridge or other reservoir 110. Those skilled in the art will appreciate that the connections may be wired or wireless (e.g., Bluetooth, 802.11 and/or optical) without departing from the scope of the present teachings.

A second wire 112 is shown with a connector 114 that may be compatible with a printer circuit board bus connector, if available. A third wire 116, is shown by way of illustration, with a connector 118 which may be suitable for connection to the parallel input/output (I/O) connector on a printer. A fourth wire 120 is shown with an associated connector 122 for effecting connection to a parallel connector for the personal computer 1000 of FIG. 1. Those skilled in the art will appreciate that the present invention is not limited to the number, nature, purpose or type of connectors used. This is illustrated more clearly with reference to FIG. 4.

Figure 4:
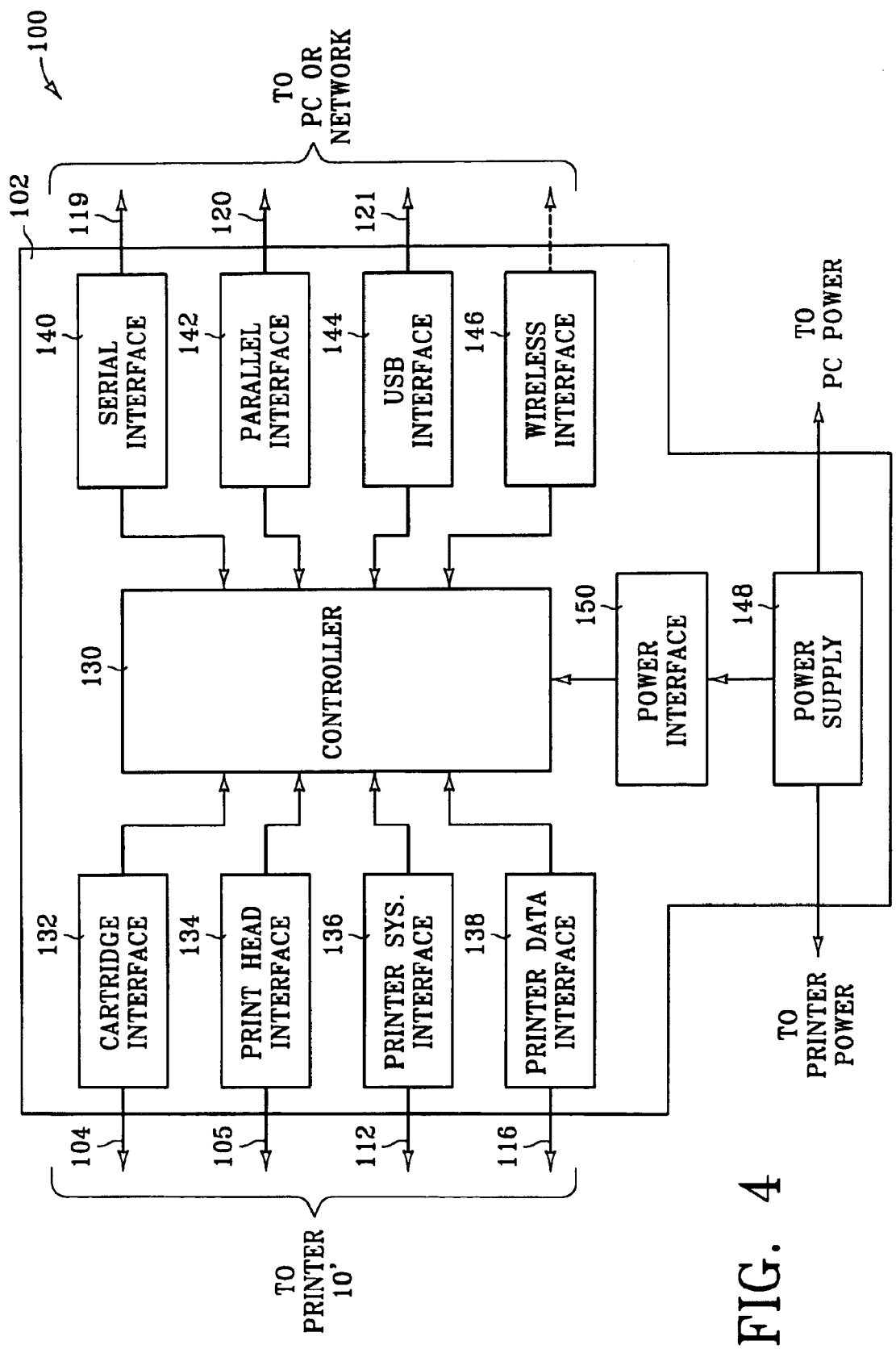
FIG. 4 is an electrical block diagram of an illustrative embodiment of a device implemented in accordance with the teachings of the present invention.

FIG. 4 is an electrical block diagram of an illustrative embodiment of a device 100 implemented in accordance with the teachings of the present invention. The inventive device 100 includes a controller 130 mounted within the housing 102. The controller may be implemented with a microprocessor, digital logic or simple discrete components depending on the application. The microprocessor 130 executes a program that enables the data received to be processed, and then returned to the printer to print the supplies status page. This program could also be software that is loaded on the PC or network to help with the management of the printer supplies. It would combine consumable information from the print head or toner cartridge, printer information, and any other supplies information available to determine if a job sent to the printer would complete with the amount of consumables that remain for use. If enough is present the job completes. If consumables or supplies will deplete during the print job, the device would notify the user through the printer or software package. In this regard, it should be noted that paper is a consumable.

The controller 130 communicates with the peripheral 10' via a number of interfaces including, by way of illustration, a cartridge interface 132, a print head interface 134, a printer system interface 136 and printer data interface 138, all of which are adapted for plug and signal compatibility with corresponding connectors (not shown) on the peripheral 10'. These interfaces may be implemented in accordance with conventional teachings to provide signal storing (latching) and signal reformatting as necessary to interface with the controller 130.

The controller 130 performs signal translation as necessary and routes the signals to the appropriate PC or network interface circuit. For illustration, four PC/network interfaces are shown in FIG. 4: a serial interface 140, a parallel interface 142, a Universal Serial Bus (USB) interface 144 and a wireless interface 146. These interface technologies are currently well known in the art. The wireless interface 146 may be a Bluetooth interface, an 802.11 interface, an optical interface or any other wireless interface.

The system 100 is adapted to receive power from the PC 1000, the peripheral 10', an AC outlet or an internal battery (shown generally as a power supply 148) via a power interface 150. The power supply 148 and the interface 150 provide power selection, level adjustment, and signal conditioning as necessary or desirable for a given application.

Figure 5:
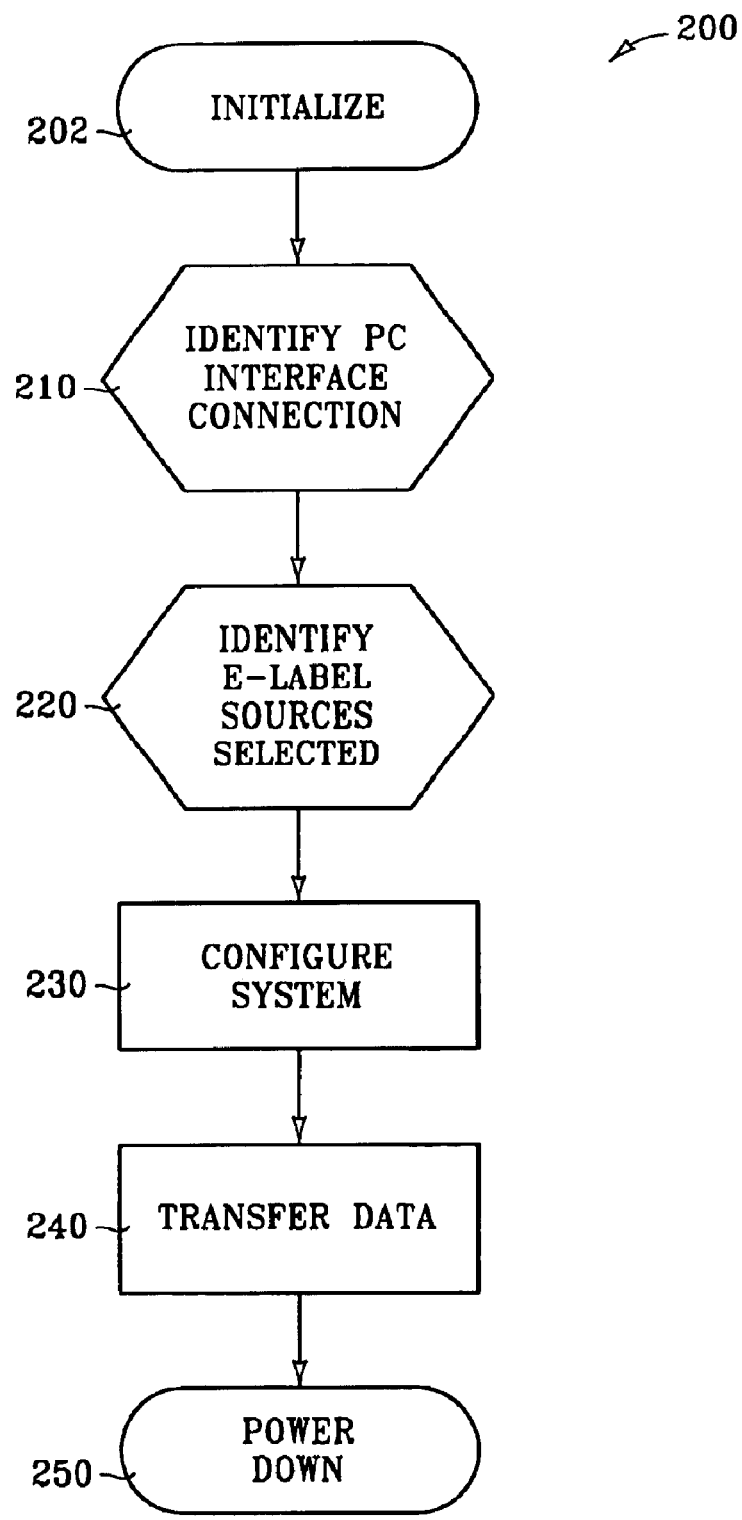
FIG. 5 is a flow diagram of an illustrative implementation of the method of the present invention.

FIG. 5 is a flow diagram of an illustrative implementation of the method of the present invention. After an initialization step 202, the inventive method 200 includes the steps of identification of a PC or network interface connection 210 and an identification of any and all E-label sources selected 220. Tbese stops utilize auto-detect methodologies well-known in the art. After the type of PC or network interface connection is determined, the controller 130 configures itself in step 230 to read data from the E-label resources of the peripheral detected in step 220 and translate the data as necessary before routing the data to the detected PC or network interface at step 240. In step 250, the system powers down.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An intermediate resource management device remotely located from an imaging device and configured for consumable resource data communication between the imaging device and a computing device, the intermediate resource management device comprising:

an imaging device communication link configured to communicatively couple the intermediate resource management device to the imaging device;

a computing device communication link configured to communicatively couple the intermediate resource management device to the computing device;

a first communication interface configured to receive the consumable resource data from the imaging device via the imaging device communication link;

a controller configured to receive the consumable resource data from the imaging device via the imaging device communication link and the first communication interface, the controller further configured to process the consumable resource data for communication as status data to the computing device; and a second communication interface configured to receive the status data from the controller and communicate the status data to the computing device via the computing device communication link.

2. An intermediate resource management device as recited in claim 1, the first communication interface is further configured to receive the consumable resource data from a consumable resource sensor of the imaging device.

3. An intermediate resource management device as recited in claim 1, wherein the first communication interface is further configured to receive imaging medium consumption data as the consumable resource data. form an imaging medium sensor of the imaging device.

4. An intermediate resource management device as recited in claim 1, wherein the first communication interface is further configured to receive print media consumption data as the consumable resource data from a print media sensor of the imaging device.

5. An intermediate resource management device as recited in claim 1, wherein the first communication interface as further configured to receive printhead status information as the consumable resource data from a printhead sensor of the imaging device.

6. An intermediate resource management device as recited in claim 1, wherein the imaging device communication link includes a cartridge connector configured for connection to a cartridge of the imaging device such that imaging medium consumption data can be communicated from the cartridge to the intermediate resource management device as the consumable resource data via the imaging device communication link.

7. An intermediate resource management device as recited in claim 1, wherein the imaging device communication ink includes a connector configured for connection to a print media detection system of the imaging device such that print media consumption data can be communicated from the print media detection system to the intermediate resource management device as the consumable resource data via the imaging device communication link.

8. An intermediate resource management device as recited in claim 1, wherein the imaging device communication link includes a connector configured for connection to a printhead of the imaging device such that printhead status information can be communicated from the printhead to the intermediate resource management device as the consumable resource data via the imaging device communication link.

9. An intermediate resource management device remotely located from an imaging device and configured for consumable resource data communication between the imaging device and a computing device, the intermediate resource management device comprising:

a computing device communication link configured to communicatively couple the intermediate resource management device to the computing device;

a cartridge interface configured to receive imaging medium consumption data from a cartridge of the imaging device via a cartridge communication link that couples the cartridge to the intermediate resource management device;

a printer interface configured to receive print media consumption data from the imaging device via a printer communication link that couples the imaging device to the intermediate resource management device;

a printhead interface configured to receive printhead status information from a printhead of the imaging device via a printhead communication link that couples the printhead to the intermediate resource management device;

a controller configured to process the imaging medium consumption data, the print media consumption data, and the printhead status information to generate consumable resource data for communication to the computing device; and a computer interface configured to receive the consumable resource data from the controller and communicate the consumable resource data to the computing device via the computing device communication link.

10. An intermediate resource management device as recited in claim 9, wherein the cartridge interface is further configured to receive the imaging medium consumption data from an imaging medium sensor of the cartridge.

11. An intermediate resource management device as recited in claim 9, wherein the printer interface is further configured to receive the print media consumption data from a print media detection sensor of the imaging device.

12. An intermediate resource management device as recited in claim 9, wherein the printhead interface is further configured to receive the printhead status information from a printhead sensor of the printhead.

13. An intermediate resource management device as recited in claim 9, wherein:

the cartridge interface is further configured to receive the imaging medium consumption data from an imaging medium sensor of the cartridge;

the printer interface is further configured to receive the print media consumption data from a print media detection sensor of the imaging device; and the printhead interface is further configured to receive the printhead status information from a printhead sensor of the printhead.

14. A method for consumable resource data communication to a computing device via an intermediate resource management device remotely located from an imaging device, the method comprising:

receiving imaging medium consumption data, print media consumption data, and printhead status information from the imaging device via one or more imaging device communication links that each communicatively couple the imaging device to the intermediate resource management device;

processing the imaging medium consumption data, print media consumption data, and printhead status information to generate the consumable resource data for communication to the computing device; and communicating the consumable resource data to the computing device via a computer interface and a computing device communication link that communicatively couples the computing device to the intermediate resource management device.

15. A method as recited in claim 14, wherein receiving the imaging medium consumption data includes receiving the imaging medium consumption data from a cartridge of the imaging device via a cartridge communication link that couples the cartridge to the intermediate resource management device.

16. A method as recited in claim 14, wherein receiving the print media consumption data includes receiving the print media consumption data from the imaging device via a printer communication link that couples the imaging device to the intermediate resource management device.

17. A method as recited in claim 14, wherein receiving the printhead status information includes receiving the printhead status information from a printhead of the imaging device via a printhead communication link that couples the printhead to the intermediate resource management device.

18. A method as recited in claim 14, wherein:

receiving the imaging medium consumption data includes receiving the imaging medium consumption data from a cartridge of the imaging device via a cartridge communication link that couples the cartridge to the intermediate resource management device;

receiving the print media consumption data includes receiving the print media consumption data from the imaging device via a printer communication link that couples the imaging device to the intermediate resource management device; and receiving the printhead status information includes receiving the printhead status information from a printhead of the imaging device via a printhead communication link that couples the printhead to the intermediate resource management device.

19. A method as recited in claim 14, wherein receiving the imaging medium consumption data includes receiving the imaging medium consumption from a cartridge of the imaging device via a cartridge communication link that couples the cartridge to a cartridge interface of the intermediate resource management device.

20. A method as recited in claim 14, wherein receiving the print media consumption data includes receiving the print media consumption data from the imaging device via a printer communication link that couples the imaging device to a printer interface of the intermediate resource management device.

21. A method as recited in claim 14, wherein receiving the print head status information includes receiving the printhead status information from a printhead of the imaging device via a printhead communication link that couples the printhead to a printhead interface of the intermediate resource management device.

22. A method as recited in claim 14, wherein receiving the imaging medium consumption data includes receiving the imaging medium consumption from an imaging medium sensor of the imaging device.

23. A method as recited in claim 14, wherein receiving the print media consumption data includes receiving the print media consumption data from a print media sensor of the imaging device.

24. A method as recited in claim 14, wherein receiving the printhead status information includes receiving the printhead status information from a printhead sensor of the imaging device.

* * * * *

UNITED STATES PATENT AND TRADEMARK OFFICE
CERTIFICATE OF CORRECTION

PATENT NO. : 6,868,462 B2  Page 1 of 1
APPLICATION NO. : 09/951584
DATED : March 15, 2005
INVENTOR(S) : Kolodziej It is certified that error appears in the above-identified patent and that said Letters Patent is hereby corrected as shown below:

Col. 1 (line 24), delete "Mmage" and insert therefor --Message--.

In the Claims

Col. 5 (line 19), delete "as" and insert therefor --is--.

Col. 8 (line 6), delete "print head" and insert therefor --printhead--.

Signed and Sealed this

Twenty-second Day of August, 2006

JON W. DUDAS
*Director of the United States Patent and Trademark Office*